US007657460B2

(12) United States Patent  (10) Patent No.: US 7,657,460 B2
Findley  (45) Date of Patent: Feb. 2, 2010

(54) DEVICE FOR SELECTIVELY BLOCKING REMOTE PURCHASE REQUESTS

(76) Inventor: Thomas A. Findley, 4219 SW. Freeman St., Portland, OR (US) 97219

(*) Notice: Subject to any disclaimer, the term of this patent is extended or adjusted under 35 U.S.C. 154(b) by 382 days.

(21) Appl. No.: 11/563,577

(22) Filed: Nov. 27, 2006

(65) Prior Publication Data
US 2007/0136199 A1 Jun. 14, 2007

Related U.S. Application Data

(63) Continuation of application No. 10/782,023, filed on Feb. 18, 2004, now Pat. No. 7,158,947.

(51) Int. Cl.
G06Q 30/00 (2006.01)
G06Q 20/00 (2006.01)
(52) U.S. Cl. .................. 705/26; 705/44; 705/75
(58) Field of Classification Search .......... 705/26, 705/44, 75; 235/380
See application file for complete search history.

(56) References Cited

U.S. PATENT DOCUMENTS

| 3,719,927 | A |  | 3/1973 | Michels et al. ............. 340/5.4 |
| 3,854,007 | A |  | 12/1974 | Hatton ...................... 370/294 |
| 5,243,174 | A |  | 9/1993 | Veeneman et al. ......... 235/381 |
| 5,309,501 | A |  | 5/1994 | Kozik et al. ................ 455/410 |
| 5,311,594 | A |  | 5/1994 | Penzias ...................... 713/183 |
| 5,335,278 | A |  | 8/1994 | Matchett et al. ............ 380/248 |
| 5,420,910 | A |  | 5/1995 | Rudokas et al. ............. 455/410 |
| 5,513,250 | A |  | 4/1996 | McAllister ................ 379/91.02 |
| 5,530,438 | A |  | 6/1996 | Bickham et al. ............ 340/5.8 |
| 5,555,551 | A |  | 9/1996 | Rudokas et al. ............. 455/410 |
| 5,566,234 | A |  | 10/1996 | Reed et al. ................. 379/188 |
| 5,606,604 | A |  | 2/1997 | Rosenblatt et al. .......... 379/198 |
| 5,615,110 | A |  | 3/1997 | Wong ........................ 705/38 |
| 5,638,430 | A |  | 6/1997 | Hogan et al. ............ 379/114.14 |
| 5,652,786 | A |  | 7/1997 | Rogers ..................... 379/91.01 |
| 5,657,389 | A |  | 8/1997 | Houvener .................... 713/186 |
| 5,724,424 | A |  | 3/1998 | Gifford ....................... 705/79 |
| 5,729,599 | A | * | 3/1998 | Plomondon et al. ...... 379/211.02 |
| 5,754,655 | A |  | 5/1998 | Hughes et al. ............... 705/70 |
| 5,781,632 | A |  | 7/1998 | Odom ........................ 705/78 |
| 5,862,220 | A |  | 1/1999 | Perlman .................... 713/162 |
| 5,884,289 | A |  | 3/1999 | Anderson et al. ............ 705/44 |

(Continued)

FOREIGN PATENT DOCUMENTS

EP  0540234 A2  5/1993

(Continued)

OTHER PUBLICATIONS

McCormick, J., "Export Restrictions Tough to Enforce Says US Company," Newsbytes, NEW01140022, Jan. 14, 1991.*

(Continued)

Primary Examiner—Nicholas D Rosen

(57) ABSTRACT

A method for partially verifying the legitimacy of a remote purchase request based on a card number from a card issuing financial institution. The method includes receiving and storing a first purchase request information set including an origin and a card number. Further, the origin and the card number are sent to the card issuing financial institution to determine if the origin matches an origin on file for the card number at the card issuing financial institution.

9 Claims, 3 Drawing Sheets

U.S. PATENT DOCUMENTS

| | | | | |
|---|---|---|---|---|
| 5,903,878 | A | 5/1999 | Talati et al. | 705/26 |
| 5,917,893 | A | 6/1999 | Katz | 379/93.02 |
| 5,996,076 | A | 11/1999 | Rowney et al. | 713/156 |
| 6,018,724 | A | 1/2000 | Arent | 705/44 |
| 6,029,154 | A | 2/2000 | Pettitt | 705/44 |
| 6,085,976 | A | 7/2000 | Sehr | 235/384 |
| 6,092,057 | A | 7/2000 | Zimmerman et al. | 705/44 |
| 6,095,413 | A | 8/2000 | Tetro et al. | 235/380 |
| 6,098,879 | A * | 8/2000 | Terranova | 235/384 |
| 6,466,780 | B1 | 10/2002 | Geiselman et al. | 455/411 |
| 6,529,725 | B1 | 3/2003 | Joao et al. | 455/406 |
| 6,931,380 | B2 | 8/2005 | Shedd et al. | 705/44 |

FOREIGN PATENT DOCUMENTS

| | | |
|---|---|---|
| JP | 407262455 A | 10/1995 |

OTHER PUBLICATIONS

Keppler, K., "Falcon Fights Credit Fraud," AI Expert, vol. 8, No. 3, p. 56, Mar. 1993.*

Schwartz, L., et al., "Surviving the Chargeback Rule," Direct marketing, vol. 54, No. 8, p. 23, Dec. 1991.

Borenstein, N. S., "Perils and Pitfalls of Practical Cybercommerce," Communications of the ACM, vol. 39, No. 6, pp. 36-44, Jun. 1996.

Anon., "Cybersource and Paymentech Join Forces to Provide Robust Payment Capability and Attack Credit Card Fraud," PR Newswire, Sep. 22, 1998.

DeFranco, L., "Paper or Plastic," Florist, vol. 31, p. 49(2p), Sep. 1, 1997.

Schwartz, L., et al., "50 Simlpe Precautions Help Retailers Protect Against Credit Card Fraud," Merchandising, vol. 10, p. 54, Dec. 1985.

Anon. "Pearl Jam Tour Set for Merriweather, without Ticketmaster," Baltimore Morning Sun, Aug. 3, 1996, F ed., p. 2D.

* cited by examiner

US 7,657,460 B2

DEVICE FOR SELECTIVELY BLOCKING REMOTE PURCHASE REQUESTS

RELATED APPLICATIONS

This application is a continuation of U.S. patent application Ser. No. 10/782,023, filed Feb. 18, 2004 now U.S. Pat. No. 7,158,947, which is incorporated herein by reference and to which priority is claimed. This application further relates to U.S. Pat. No. 6,108,642, which is also incorporated herein by reference.

BACKGROUND OF THE INVENTION

Merchants who sell goods on credit over the telephone or the internet ("remote sale merchants") encounter the difficult problem of credit card fraud. Unlike a merchant selling goods on credit in the physical presence of the purchasers, a remote sale merchant does not have an opportunity to inspect the signature of the purchaser or to compare a photo ID card with the purchaser's actual appearance.

Typically, a remote sale merchant employs a computer system having terminals or "voice response units," each of which is connected with a telephone line and is controlled by an operator wearing the commonly familiar telephone headset and receiving telephone calls Each operator typically answers the telephone and receives purchase request information from the caller that includes the merchandise that the caller wishes to purchase, the person and address to which the merchandise should be delivered, the name of the person making the purchase and a credit or debit card number to which the purchase should be charged. (As used in this application the term "card number" refers to any charge authorizing number including debit card numbers, credit card numbers, or a charge authorizing number that is not shown on any card.) The operator enters this information into the terminal and presses a keyboard button which causes the computer system to send an authorization query to the card issuing financial institution. The decision to authorize is typically based on whether the number is legitimate, adequate funds are available in the account, and the card holder is current on his or her payments. If the card issuing financial institution declines the charge, the caller is told that the purchase cannot be made. If the financial institution accepts, a charge to the card number account is initiated and the purchase and shipping address information is automatically forwarded to the shipping department which fills the order. Optionally, the financial institution may offer an address verification service (AVS). To utilize this service the remote purchase merchant transmits the shipping address or zip code to the financial institution, which responds with a flag indicating whether or not the address and/or zip code matches the billing address on file.

Another computer system for effecting remote purchases is a computer system for enabling parties to purchase items over the internet or from a computer connected by modem to the computer system. In such a computer system, the party making a purchase request enters his or her credit card number and a descriptor or descriptors of the merchandise to be purchased into a remote terminal that is connected by way of the internet or a telephone line to the computer system. Again, the computer system generates an authorization query to the card issuing financial institution and contacts the shipping department to fill the order if the purchase is authorized.

Unfortunately, there is sometimes a considerable time interval between the time a credit card is stolen and the time when the theft of the card is reported to the card issuing financial institution. Moreover, the notation and illicit use of a credit card number by a dishonest store clerk or, other person able to observe the number is likely to be completely undetected until the number is used fraudulently and the card holder receives his or her statement.

When a cardholder does receive a statement bearing fraudulent charges, he or she is likely to quickly disavow the purchases. In these cases the card issuing financial institution typically will ask the merchant to corroborate the purchase with a copy of a signed credit card receipt. For the case of a remote purchase, the merchant will not be able to produce a signed receipt. In this situation the merchant is forced to accept a "charge back" and to return the funds to the card issuing institution.

Credit card fraud varies from casual fraud by the occasionally dishonest and adventurous to sophisticated operations that attempt to purchase a large quantity of a particular item and to profitably reintroduce it into the stream of commerce. As systems for selling items over the internet and telephone lines become increasingly automatic, fraud systems also become more automatic. For example, it has been known for thieves to use a computer to invent credit card numbers and submit a large number of purchase requests, knowing that a portion of the invented card numbers will be for issued credit cards and hoping that some of the purchase requests will be accepted.

Despite the occurrence of fraud, the convenience and speed of using credit cards to make remote purchases is causing a continued expansion in catalog sales, advertised telephone sales and sales over the internet.

SUMMARY OF THE INVENTION

In a first separate aspect, the present invention is a method for partially verifying the legitimacy of a remote purchase request based on a card number from a card issuing financial institution. The method includes receiving and storing a first purchase request information set including an origin and a card number. Further, the origin and the card number are sent to the card issuing financial institution to determine if the origin matches an origin on file for the card number at the card issuing financial institution.

In a second separate aspect, the present invention is a computer system for processing and selectively blocking a current remote purchase request. The computer system comprises a data input subsystem, connected to a, data line, capable of receiving a purchase request information set, including a purchase request origin. In addition, a memory subsystem is adapted to store the purchase request information set and a negative file of origin. Finally, a logic subsystem is adapted to automatically compare the purchase request origin with the negative file of origins and to automatically block the purchase request if the purchase request origin matches any origin in the negative file of origins.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
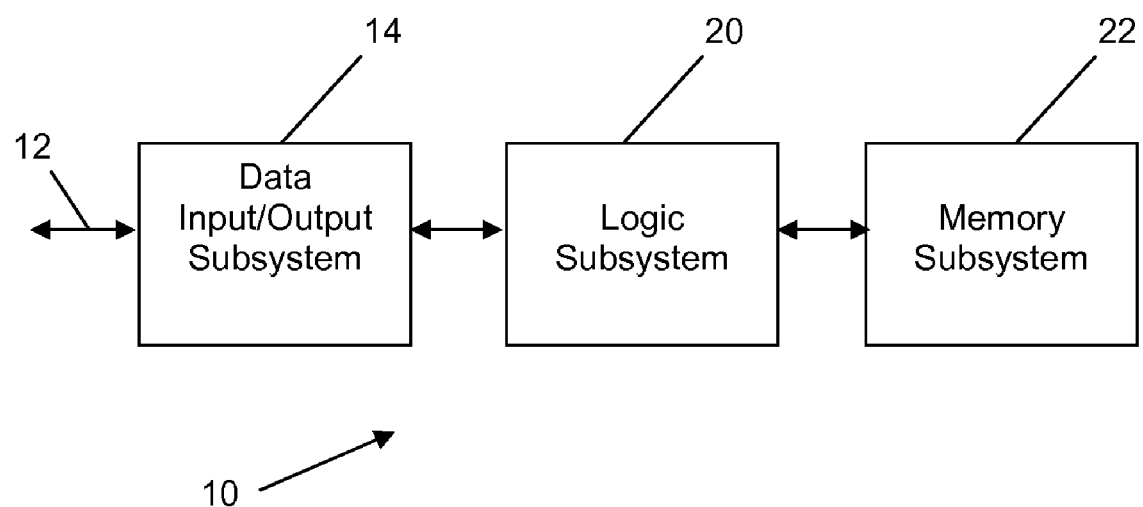
FIG. 1 is a block diagram of a remote purchase processing computer system according to the present invention.
Figure 2A:
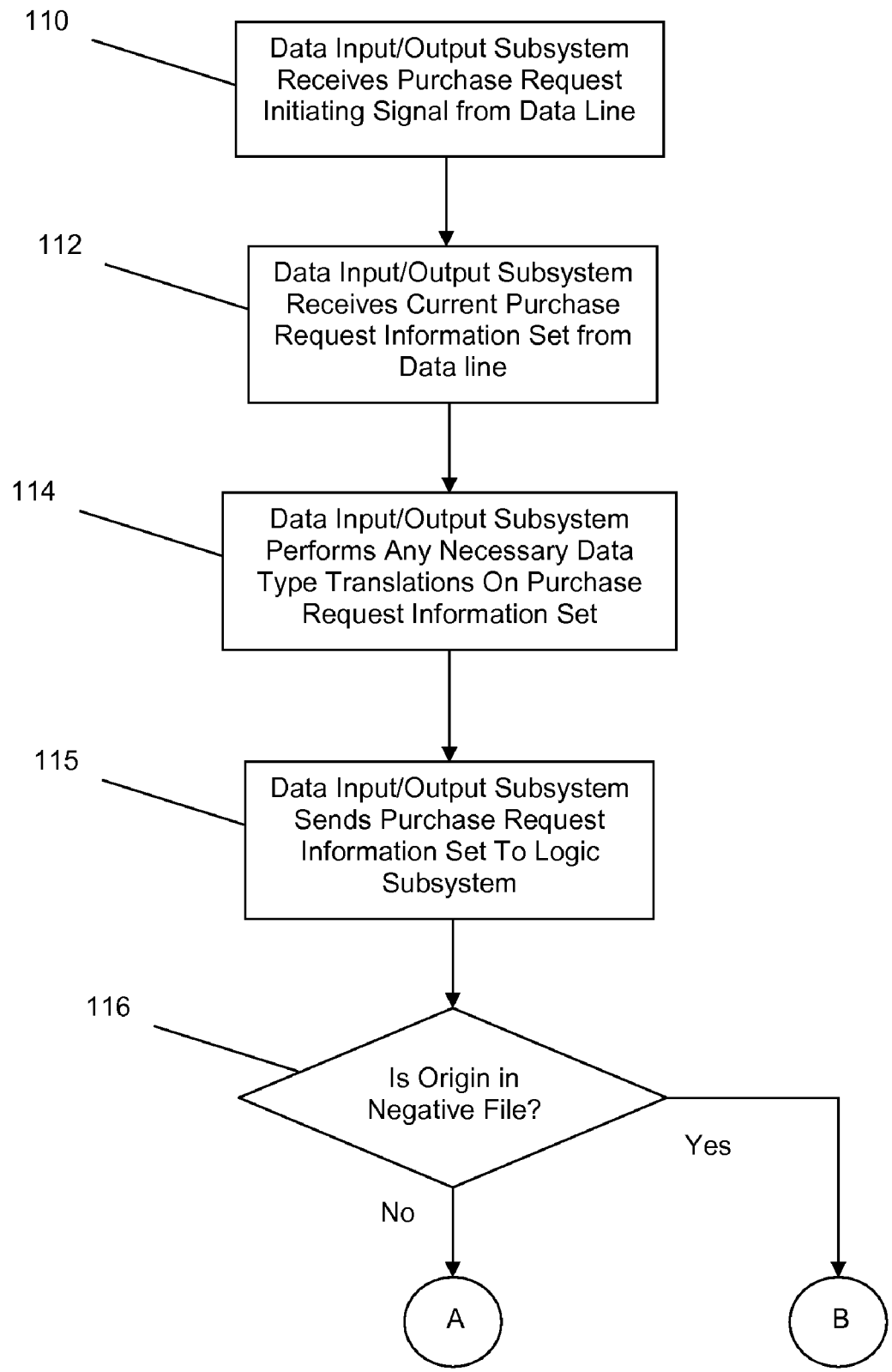
FIG. 2A is a flow chart of the beginning part of the logic process implemented in the system of FIG. 1.

A preferred embodiment of the present invention comprises a remote purchase processing computer system 10 that is connected to a data line 12, over which it receives a remote purchase request initiating signal (block 110 in FIG. 2*a*). In one preferred embodiment, data line 12 is a telephone line. In this instance, the purchase request initiating signal (block 110) would be a ring signal received over the telephone line. A data input subsystem 14 answers the ring signal, in a manner familiar to those skilled in the art of telephony, and automatically receives a caller ID signal describing the telephone number of the calling station (block 112). In many systems 10, data input subsystem 14 includes a human operator or operators who query the callers, hear the purchase request information (block 112) and translate the auditory purchase request information into a set of keystrokes (block 114) that are input into system 10 via a terminal keyboard. It is becoming increasingly common, however, to avoid the necessity of employing a human operator by allowing the caller to enter all of the information by way of a telephone keypad. A dual tone modulated frequency translation system is used to translate information (block 114) that the purchase requestor inputs into the telephone keypad. For those who are calling by way of their own computer/modem system, data input system 14 would include a modem for collecting all of the purchase information set.

Alternatively, data line 12 could be a direct connection to the internet or some other computer network. In this embodiment, computer system 10 receives the internet address of the purchase request information over data line 12 and subsystem 14 does not employ a human operator.

In any one of the embodiments, each assembled purchase request information set is sent (block 115) to a logic subsystem 20. Logic subsystem 20 compares the purchase request information set to information stored in a memory subsystem 22. The bulk of the information in memory subsystem 22 typically will have been gathered from previous purchase requests. Even if there are many terminals in data input subsystem 14 all of the information sets are cataloged together in memory subsystem 22 so that a more effective data bank is constructed. Information in memory subsystem 22, however, may also have been gathered from other sources. For example, a merchant may decide to not authorize purchase requests from telephone calls originating from jails and prisons. Therefore; all of the telephone numbers for telephones in jails and prisons are kept in "a "negative file" of origins that will result in automatic rejection when detected (decision box 116 of FIG. 2A). Optionally, when the remote merchant determines that an origin has generated a fraudulent purchase, the fraudulent purchase generating origin is also entered into the negative file (typically this is done manually by a keyboard operator).

In one preferred embodiment, "history factors" are computed for both card numbers and origins so that the algorithm can take into account the legitimate purchase history of both the purchase request origin and card number. A purchase request from an origin or card number that has been used to make legitimate purchases from the merchant in the past is less likely to be fraudulent then a call from a Origin or card number encountered for the first time. Although it is possible that a thief who has just acquired a stolen card number will make a remote purchase request to a merchant that the legitimate card holder purchased from in the past, it is more likely that the thief will have different tastes and seek to purchase from different merchants to whom the stolen card number and the thief's origin will be new.

Equations 1, 2, 3, and 4 given below show the calculation of these factors.

For residences:

$$OHF = 1 + 0.001 \times \sum^{P} (D \times \min[N, 10]) \quad (1)$$

where OHF=origin history factor,
D=dollar purchase amount,
N=number of months since date of purchase (N≧1), and
P=all same-origin no-fraud-indication purchases more than 1 month old.

$$\text{Public and semi-public telephone, } OHF=0.2 \quad (2)$$

$$CNHF = 1 + 0.001 \times \sum^{C} (D \times \min[N, 10]) \quad (3)$$

where CNHF=card number history factor,
D=dollar purchase amount,
N=number of months since date of purchase, and
C=all the same-card number no-fraud-indication purchases more than 1 month old.

$$PRHF=\text{Max}(CNHF, OHF) \quad (4)$$

where PRHF=purchase request history factor.

Figure 2B:
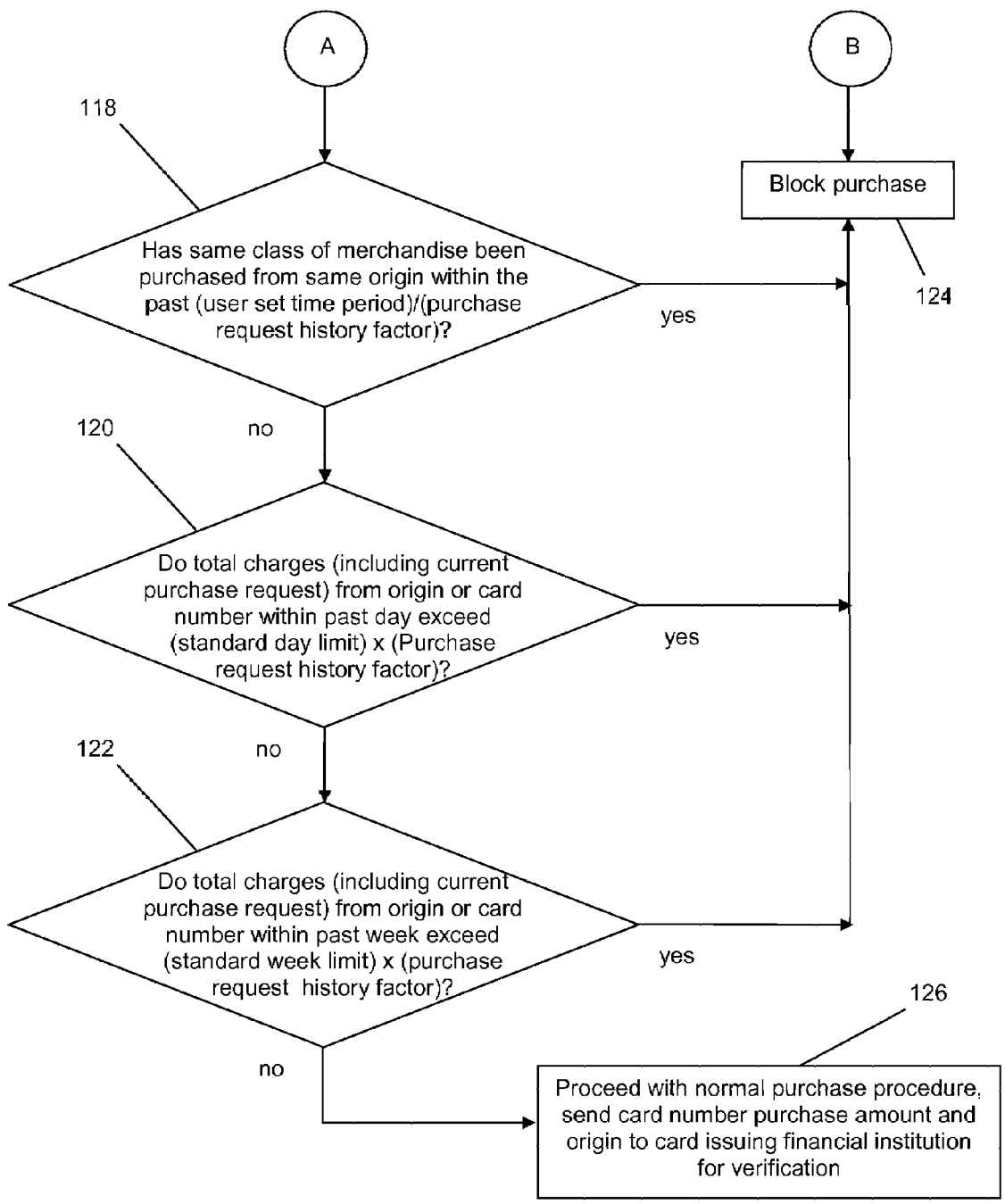
FIG. 2B is a flow chart of the end part of the logic process implemented in the system of FIG. 1.

The history factors are used to determine the amount of purchases which are allowed over a particular time period as shown in decision boxes 118, 120 and 122 in FIG. 2B. The longer a purchase is outstanding-without being detected as fraudulent, the greater the probability that the purchase was, indeed, legitimate. For the first one month period, of course, little confidence can be had in the purchase, because there is no guarantee that the card holder has been billed for the purchase. Therefore, purchases less than one month old are not counted. After that the purchases are given greater weight as they age, until at ten months, when there is little chance of undetected fraud yet being detected, they reach their maximum weight.

Purchase requests from public and semi-public telephone numbers such as numbers originating from motels and pay telephones are given an origin history factor of 0.2, because no meaningful history can be compiled (equation 2). Also, a person wishing to commit remote purchase fraud is likely to use a telephone which cannot be traced to his or her home address, where he or she is more likely to be identified. Therefore, telephone calls originating from public or semi-public telephones are more likely to originate fraudulent calls.

Next, an inquiry is made into whether or not an item in the same merchant-defined merchandise category has been purchased within the previous merchant set time period divided by the purchase request history factor (decision box 118). Sophisticated remote purchase thieves may try to steal a sizable quantity of particular product because it is easier to illicitly reintroduce a set of uniform items back into the stream of commerce than to do the same for an eclectic mix. For example, a ring of thieves may attempt to steal 1,000 handbags of a particular popular make. By having a safeguard such as that in block 118 the merchant limits its exposure to repetitive theft from the same merchandise category.

Decision boxes 120 and 122 place limits on the monetary value of a day's purchase and a week's purchase from the same origin. This enables a merchant to limit its exposure to fraud. In particular, this addresses the case in which a thief has compiled a quantity of credit card numbers and is calling from the same origin, but using a different card number each time to avoid any limits placed on each card number. If a merchant prefers, time periods other than a day or a week may be chosen.

If the test results of decision boxes 118, 120 or 122 are positive, then the purchase is automatically blocked (block 124) and the case of an operator controlled terminal, the key which causes a query to be sent to a financial institution is disabled. Together, boxes 118, 120 and 122 comprise a set of criteria, any criterion of which could cause the purchase request to be blocked, if satisfied in the negative. The term "set of criteria," as used in this application, may include as few as one criterion only.

If the purchase is tentatively authorized in decision box 122, the origin, card number and purchase amount, and other data as required are sent to the card issuing financial institution for verification (block 126). If the financial institution has no origin verification service, then the sending of the origin may be omitted. The financial institution that does have an origin verification service will send back a signal indicating whether or not the origin matches any origin that it has on file for that card number. If any of the tests of boxes 118, 120 or 122 were "near misses," for example if the time since the last purchase of the same category of merchandise (box 118) was not much greater than the (user set time period)/(purchase request history factor), then a bit would be set that would cause the purchase request to be denied if the origin verification was returned in the negative. The user may be queried to supply his home telephone number, so that the origin sent to the card issuing financial institution for verification will more likely be the one on file.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A computer-implemented method for selectively blocking a remote purchase in which a purchaser attempts to use a card number to purchase one or more of an item from a vendor's system, wherein the method is implemented in a purchase verification computer system configured to detect potentially fraudulent transactions, comprising:

receiving at the purchase verification computer system, a first purchase request information set corresponding to a first purchase request to the vendor's system, wherein the first purchase information request set includes (i) an origin of the first purchase request, the origin representing either a telephone number or internet address, (ii) a card number for the first purchase request, (iii) a requested item identification for an item requested in the first purchase request, the requested item identification being associated with a first merchandise category, and (iv) a number of requested items in the first purchase request for the requested item identification;

storing, to an electronic memory subsystem accessible by the purchase verification computer system, the first purchase request information set, wherein the electronic memory subsystem also stores previously received purchase request information sets corresponding to a plurality of previous purchase requests, the stored previously received purchase request information sets including a second purchase request information set corresponding to a second purchase request previously received by the vendor's system from the same origin as the first purchase request, and wherein a requested item identification from the second purchase request information set is also associated with the first merchandise category;

automatically determining in the purchase verification computer system whether a number of items associated with the first merchandise category that are requested in purchase request information sets corresponding to the origin of the first purchase request exceeds a preset threshold number of items associated with the first merchandise category, wherein the number of items associated with the first merchandise category that are requested in purchase requests corresponding to the origin of the first purchase request comprises at least the number of items associated with the first merchandise category requested in the first purchase request and the number of items associated with the first merchandise category requested in the second purchase request; and automatically transmitting instructions from the purchase verification computer system to the vendor's system to block the purchase associated with the first purchase request responsive to a determination that the number of items associated with the first merchandise category that are requested in purchase request requests corresponding to the origin of the first purchase request exceeds the preset threshold number of such items.

2. The method of claim 1, wherein determining whether the number of items associated with the first merchandise category that are requested in purchase request information sets corresponding to the origin of the first purchase request exceeds the preset threshold number comprises determining whether the number of items associated with the first merchandise category within a set time period exceeds a preset threshold number of such items for the set time period.

3. The method of claim 1, wherein the number of items in the first merchandise category includes the number of requested item in the first purchase request for the requested item identification.

4. The method of claim 1, wherein determining whether the number of items in purchase request information sets corresponding to the origin in the first merchandise category exceeds the preset threshold number is performed prior to delivery of the remote purchase request to a card issuer by the vendor; and wherein automatic transmission of instructions to block the purchase associated with the first remote purchase request results in blocking of the first purchase request from being delivered to the card issuer.

5. The method of claim 1, further comprising:

determining, via the purchase verification computer system, whether said origin is a public or semi-public telephone; and automatically transmitting instructions from the purchase verification computer system to the vendor's system to block the purchase associated with the remote purchase request responsive to a determination that said origin is a public or semi-public telephone.

6. A method for partially verifying the legitimacy of a remote purchase request based on a card number from a card issuing institution and an origin from which said remote purchase request is made, comprising:

receiving, at a purchase verification computer system configured to detect potentially fraudulent transactions, a first purchase request information set corresponding to a first purchase request to the vendor's system, wherein the first purchase request information set includes an origin of the first purchase request and a card number for the first purchase request;

storing, via the purchase verification computer system, the received first purchase request information set to electronic storage media accessible to the purchase verification computer system, wherein the electronic storage media further stores one or more past purchase request information sets associated with a history of purchases made from the origin, wherein such one or more past purchase request information sets include at least a second purchase request information set that corresponds to a second purchase request previously generated from the origin, wherein the electronic storage media further stores one or more past purchase request information sets associated with a history of purchases made with the card number, and wherein such one or more past purchase request information sets include at least a third purchase request information set that corresponds to a previously received third purchase request using the card number;

determining automatically within the purchase verification computer system an origin history factor related to the legitimacy of purchase requests from the origin, wherein the origin history factor is determined by the purchase verification computer system based on information from at least the second purchase request information set and a time period between the second purchase request and the first purchase request;

determining automatically within the purchase verification computer system a card number history factor related to the legitimacy of purchase requests using the card number, wherein the card number history factor is determined by the purchase verification computer system based on information from at least the third purchase request information set and a time period between the third purchase request and the first purchase request;

determining automatically within the purchase verification computer system whether the first purchase request should be verified based on the origin history factor and the card number history factor;

automatically generating by the purchase verification computer system an indication that the first purchase request is partially verified responsive to a determination based on the origin history factor and the card number history factor that the first purchase request should be verified; and automatically transmitting said indication from the purchase verification computer system to said card issuing institution together with data related to said first purchase request.

7. The method of claim 6 further comprising:

automatically determining by the purchase verification computer system whether said origin is a public or semi-public telephone; and automatically transmitting to said card issuing institution from the purchase verification computer system an indication that said remote purchase request is not partially verified responsive to a determination that said origin is a public or semi-public telephone.

8. A computer-implemented method for partially verifying the legitimacy of a remote purchase request based on a card number from a card issuing institution and an origin from which said remote purchase request is made, wherein the method is implemented in a purchase verification computer system configured to detect potentially fraudulent transactions, the method comprising:

receiving, at the purchase verification computer system, information included in a remote purchase request made to a vendor's computer system, wherein the received information includes the origin of the remote purchase request, and a card number used by the remote purchase request;

storing to an electronic memory subsystem, via the purchase verification computer system, the received information from the remote purchase request to electronic storage media accessible to the purchase verification computer system, wherein the electronic memory subsystem also stores previously received information from previous remote purchase requests, including information from at least one previous remote purchase request from the origin and information from at least one previous remote purchase request using the card number;

determining automatically on the purchase verification computer system, based on a history of purchase requests from said origin stored in the electronic memory subsystem and a time period between the received remote purchase request and a previous remote purchase request from the origin, a first factor related to whether the purchase request is legitimate;

determining automatically on the purchase verification computer system, based on a history of purchase requests using said card number stored in the electronic memory subsystem and a time period between the received remote purchase request and a previous remote purchase request, a second factor related to whether the remote purchase request is legitimate;

determining automatically within the purchase verification computer system whether the purchase request should be verified based on the first factor and the second factor;

automatically generating by the purchase verification computer system an indication that the remote purchase request is partially verified responsive to a determination based on the first factor and the second factor that the received remote purchase request should be verified; and automatically initiating transmission of said indication from the purchase verification computer system to said card issuing institution together with data from said purchase request.

9. The method of claim 8 further comprising:

automatically determining by the purchase verification computer system whether said origin is a public or semi-public telephone; and transmitting to said card issuing institution an indication that said remote purchase request is not partially verified responsive to a determination that said origin is a public or semi-public telephone.

* * * * *

UNITED STATES PATENT AND TRADEMARK OFFICE
CERTIFICATE OF CORRECTION

PATENT NO.      : 7,657,460 B2                                              Page 1 of 1
APPLICATION NO. : 11/563577
DATED           : February 2, 2010
INVENTOR(S)     : Thomas A. Findley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 449 days.

Signed and Sealed this

Twenty-eighth Day of December, 2010

David J. Kappos
*Director of the United States Patent and Trademark Office*